United States Patent
Mosnier-Thoumas et al.

(10) Patent No.: US 12,548,449 B2
(45) Date of Patent: Feb. 10, 2026

(54) METHOD FOR OPERATING A DRIVER ASSISTANCE SYSTEM, COMPUTER PROGRAM PRODUCT, DRIVER ASSISTANCE SYSTEM, AND VEHICLE

(71) Applicant: VALEO SCHALTER UND SENSOREN GMBH, Bietigheim-Bissingen (DE)

(72) Inventors: Ludovic Mosnier-Thoumas, Bietigheim-Bissingen (DE); Markus Heimberger, Bietigheim-Bissingen (DE); Niko Moritz Scholz, Kronach Neuses (DE); Jean-Francois Bariant, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 84 days.

(21) Appl. No.: 18/553,200

(22) PCT Filed: Mar. 30, 2022

(86) PCT No.: PCT/EP2022/058356
§ 371 (c)(1),
(2) Date: Sep. 29, 2023

(87) PCT Pub. No.: WO2022/207679
PCT Pub. Date: Oct. 6, 2022

(65) Prior Publication Data
US 2024/0194077 A1    Jun. 13, 2024

(30) Foreign Application Priority Data
Mar. 30, 2021   (DE) .................... 10 2021 107 972.1

(51) Int. Cl.
*G08G 1/16* (2006.01)
*B60Q 9/00* (2006.01)
(Continued)

(52) U.S. Cl.
CPC ............. *G08G 1/166* (2013.01); *B60Q 9/008* (2013.01); *G01S 15/588* (2013.01);
(Continued)

(58) Field of Classification Search
CPC ...... G08G 1/166; B60Q 9/008; G01S 15/588; G01S 15/931; G01S 15/86
See application file for complete search history.

(56) References Cited

U.S. PATENT DOCUMENTS

| | | | |
|---|---|---|---|
| 6,215,438 B1 | 4/2001 | Oswald et al. | |
| 8,224,522 B2 * | 7/2012 | Ikeda | B60W 50/14 701/300 |

(Continued)

FOREIGN PATENT DOCUMENTS

| | | |
|---|---|---|
| DE | 102 57 842 A1 | 11/2003 |
| DE | 102006045418 A1 * | 4/2008 ........... B62D 15/028 |

(Continued)

OTHER PUBLICATIONS

Office Action issued in counterpart Japanese Patent Application No. 2023-560524 mailed Oct. 1, 2024 (24 pages).

(Continued)

*Primary Examiner* — Hoi C Lau
(74) *Attorney, Agent, or Firm* — Osha Bergman Watanabe & Burton LLP

(57) ABSTRACT

The invention relates to a method for operating a driver assistance system (110). The method has the steps of: a) receiving (S1) a drive state sensor signal (SIG0($t$)), which indicates the drive state, at a number of different points in time (t0-t5), b) receiving (S2) a number of sensor signals (Continued)

(SIG1(t)), which indicate the surroundings (200), at a number of different points in time (t0-t5), c) detecting (S3) a number of objects (210, 211) in the surroundings (200) on the basis of a first number of sensor signals (SIG1(t)), which have been detected at a first point in time, d) ascertaining (S4) a position (POS) and a movement vector (VEC) for a detected object (210, 211) on the basis of the first number of sensor signals (SIG1 (*t*)) and a second number of sensor signals (SIG1(*t*)), which have been received at a second point in time following the first point in time, using a plurality of different ascertaining methods (V1, V2), wherein different ascertaining methods (V1, V2) of the plurality have a different degree of computing complexity, and e) outputting (S5) a warning signal if a potential collision with the detected object (210, 211) is ascertained on the basis of the drive state sensor signal (SIG0(t)) received at a specified point in time and the position (POS) and the movement vector (VEC) ascertained for the detected object (210, 211).

13 Claims, 7 Drawing Sheets

(51) Int. Cl.
  *G01S 15/58* (2006.01)
  *G01S 15/931* (2020.01)
  *G01S 15/86* (2020.01)
(52) U.S. Cl.
  CPC ............ *G01S 15/931* (2013.01); *G01S 15/86* (2020.01); *G01S 2015/937* (2013.01)

(56) References Cited

U.S. PATENT DOCUMENTS

| | | | | |
|---|---|---|---|---|
| 8,731,777 | B2* | 5/2014 | Castaneda | B62D 6/002 |
| | | | | 701/2 |
| 9,511,711 | B2* | 12/2016 | Petrillo | B60K 35/00 |
| 11,733,960 | B1* | 8/2023 | Karol | G08G 1/166 |
| | | | | 340/463 |
| 2007/0171033 | A1* | 7/2007 | Nagaoka | B60W 50/14 |
| | | | | 348/148 |
| 2008/0312832 | A1 | 12/2008 | Greene et al. | |
| 2011/0163868 | A1* | 7/2011 | Gustavsson | B60Q 1/46 |
| | | | | 340/468 |
| 2012/0050025 | A1* | 3/2012 | Hoeffel | B60Q 9/007 |
| | | | | 340/435 |
| 2013/0285804 | A1* | 10/2013 | Huang | G08G 1/16 |
| | | | | 340/441 |
| 2016/0185347 | A1 | 6/2016 | Lefevre et al. | |
| 2016/0355181 | A1 | 12/2016 | Morales Teraoka et al. | |
| 2017/0354009 | A1* | 12/2017 | Jin | H05B 47/16 |
| 2018/0102055 | A1 | 4/2018 | Lim et al. | |
| 2018/0233048 | A1* | 8/2018 | Andersson | B60Q 9/008 |
| 2019/0088136 | A1 | 3/2019 | Nagata et al. | |
| 2019/0092320 | A1 | 3/2019 | Nagata et al. | |
| 2019/0250622 | A1* | 8/2019 | Nister | G06V 20/584 |
| 2019/0275993 | A1 | 9/2019 | Hiromitsu et al. | |
| 2020/0189614 | A1 | 6/2020 | Ito et al. | |
| 2021/0101529 | A1* | 4/2021 | Thorngren | E05B 85/10 |
| 2021/0107476 | A1* | 4/2021 | Cui | B60W 60/00276 |
| 2021/0114514 | A1* | 4/2021 | Karol | G06N 20/00 |
| 2021/0287546 | A1* | 9/2021 | Englander | G08G 1/166 |
| 2023/0074621 | A1* | 3/2023 | Siekierka | B60R 21/0134 |

FOREIGN PATENT DOCUMENTS

| | | |
|---|---|---|
| DE | 10 2012 214 547 A1 | 2/2014 |
| DE | 10 2017 213 353 A1 | 2/2019 |
| EP | 952 459 B1 | 5/2011 |
| JP | H09-150689 A | 6/1997 |
| JP | 2000-339595 A | 12/2000 |
| JP | 2002-225656 A | 8/2002 |
| JP | 2008-310803 A | 12/2008 |
| JP | 2015-536004 A | 12/2015 |
| JP | 2017-004106 A | 1/2017 |
| JP | 2017-186011 A | 10/2017 |
| JP | 2018-041264 A | 3/2018 |
| JP | 2018-063708 A | 4/2018 |
| JP | 2018-079846 A | 5/2018 |
| JP | 2019-053658 A | 4/2019 |
| JP | 2019-066915 A | 4/2019 |
| JP | 2020-098396 A | 6/2020 |

OTHER PUBLICATIONS

International Search Report issued in corresponding International Application No. PCT/EP2022/058356 mailed Jul. 21, 2022 (6 pages).
Written Opinion issued in corresponding International Application No. PCT/EP2022/058356 mailed Jul. 21, 2022 (8 pages).
German International Search Report issued in corresponding German Patent Application No. DE 10 2021 107 972.1 mailed Sep. 29, 2021 (7 pages).
Office Action issued by the Korean Patent Office for corresponding Korean Patent Appln. No. 2023-7037390, mailed Aug. 28, 2025 (16 pages).

* cited by examiner

METHOD FOR OPERATING A DRIVER ASSISTANCE SYSTEM, COMPUTER PROGRAM PRODUCT, DRIVER ASSISTANCE SYSTEM, AND VEHICLE

The present invention relates to a method for operating a driver assistance system, a computer program product, a driver assistance system and a vehicle having a driver assistance system of said type.

Known vehicles have a number of sensor units that enable them to detect their environment, such as ultrasonic sensors. This can be particularly useful when maneuvering and/or parking the vehicle, in particular if it is a large vehicle and/or has poor visibility. Based on the sensor data, an acoustic, haptic and/or visual signal can be output to the driver to warn them of a collision. One difficulty involves detecting moving (dynamic) objects and determining whether a collision with them might occur. A dynamic object is, in particular, another road user, such as a pedestrian or a cyclist.

DE 10 2006 045 418 A1 discloses a motor vehicle having a driver assistance system and a sensor for measuring the distance to an obstacle. It is proposed to detect a direction of motion of a moving object in order to increase road traffic safety.

Known methods for determining dynamic objects are computationally intensive and complex, which means that errors are detected more frequently and/or a time period from reception of the sensor signal to the result is quite long. This reduces the time left for a reaction in the event of an impending collision. In addition, known systems require expensive sensor technology, such as a radar, a lidar, or a camera.

Against this background, an object of the present invention is to improve the operation of a driver assistance system.

According to a first aspect, a method for operating a driver assistance system for a vehicle is proposed. The method comprises:
a) receiving a drive state sensor signal, which indicates the drive state of the vehicle, at a number of different points in time,
b) receiving a number of sensor signals, which indicate the environment of the vehicle, at a number of different points in time,
c) detecting a number of objects in the environment of the vehicle on the basis of a first number of sensor signals, which have been received at a first point in time,
d) ascertaining a position and a movement vector for a detected object on the basis of the first number of sensor signals and a second number of sensor signals, which have been received at a second point in time following the first point in time, using a plurality of different ascertainment methods, wherein different ascertainment methods of the plurality have a different degree of computing complexity, and
e) outputting a warning signal if a potential collision of the vehicle with the detected object is identified on the basis of the drive state sensor signal received at a specified point in time and the position and the movement vector identified for the detected object.

This method has the advantage that the movement of detected objects is ascertained with different ascertainment methods. In particular, a less complex and very fast ascertainment method and a more complex and somewhat slower ascertainment method can both be used. For example, the different ascertainment methods have different accuracy and/or reliability with respect to their respective results. In particular, a less complex ascertainment method can be less reliable, but it can save time, particularly in critical situations.

The drive state sensor signal comprises, for example, odometry data of the vehicle, such as a current speed, a current wheel rotation speed, a current wheel angle, and/or a current steering angle. In particular, a direction of the vehicle, for example, a future trajectory or a driving tube, can be ascertained on the basis of the drive state sensor signal.

In particular, the fact that the driving state sensor signal is received at a number of different points in time is to be understood in the present case to mean that at any given point in time the current drive state sensor signal at that particular time is received. The current drive state sensor signal is indicative in particular of the current drive status at the current time. For example, the drive state sensor signal is received at regular intervals, in particular periodically, for example at a frequency of more than 1 Hz, preferably at least 10 Hz, preferably up to 100 Hz. For example, a change in the driving state can be ascertained on the basis of at least consecutive drive state sensor signals.

The sensor signals that are indicative of the environment of the vehicle include, in particular, ultrasonic sensor signals. The fact that a number of sensor signals is received is to be understood to mean in the present case in particular that, for example, sensor signals are received from a number of different sensors, wherein different sensors on the one hand include sensors of the same type but different arrangement and/or orientation, and on the other hand also include sensors of different types, such as an ultrasonic sensor and a camera. The number involved is a quantity greater than or equal to one. The sensor signals can also be received by virtual sensors. Alternatively, it could be said that the sensor signals are retrieved. For example, a sensor provides an output signal which can be retrieved accordingly by external components, for example by the driver assistance system.

The fact that the number of sensor signals is received at a number of different points in time is to be understood in the present case to mean in particular that at any given point in time the current sensor signals at that particular time are received. Preferably, all sensor signals of the number are received at one point in time, for example as a data packet comprising all sensor signals of the number.

It should be noted that different sensor signals of the number, for example sensor signals from two different ultrasonic sensors, may have different detection time points, even if the number of sensor signals is received at one point in time.

It may also be the case that an interval between two sensor signals of a particular sensor is different from an interval between two sensor signals of another sensor. Preferably, each sensor provides its sensor signal at regular intervals, in particular periodically, for example at a frequency of more than 1 Hz, preferably at least 10 Hz, preferably up to 100 Hz, wherein at any given point in time the current sensor signal is always provided.

The points in time at which the number of sensor signals is received may differ from the times at which the drive status sensor signal is received.

In particular, the fact that a number of objects in the vicinity of the vehicle is detected on the basis of a first number of sensor signals received at a first point in time is understood in the present case to mean that the first number of sensor signals received is processed and/or analyzed, and as a result of the processing and/or analysis, a number of objects is detected. The processing and/or analysis comprises, for example, a signal analysis of the individual sensor signals and/or a signal analysis of multiple correlated sensor signals.

The number of objects is greater than or equal to one.

A position and movement vector is identified for at least one of the detected objects. A single sensor signal at one point in time may be sufficient to ascertain the position. To ascertain the movement vector, at least two sensor signals, which were received at different times, are necessary. To ascertain the movement vector, two sensor signals of a particular sensor received at different times are preferably used, but sensor signals of different sensors that were received at different times can also be used. The more sensor signals are used for a given object, the more accurately the position and the movement vector can be identified. In addition, it is advantageous to keep the time interval between two sensor signals as short as possible to improve the accuracy and validity, since the movement vector can change at any time, for example, if a pedestrian stops or starts to move abruptly.

The position of the object refers in particular to a position in a coordinate system of the vehicle and has at least two coordinates. The position of the object can refer to a single point of the object.

The movement vector comprises in particular a two-dimensional vector. For example, a magnitude of the movement vector corresponds to the speed of the object.

The plurality of different ascertainment methods comprises at least two ascertainment methods, which have a different degree of computing complexity. For example, in a first ascertainment method, the position determination and the movement vector determination is carried out directly on the basis of raw sensor data, and in a second ascertainment method, processed data is generated on the basis of the raw data and the position determination and the movement vector determination are carried out based on the processed data. Raw sensor data is in particular the unprocessed output signal of a particular sensor. By eliminating a pre-processing stage, this ascertainment procedure can be particularly fast. On the other hand, signal noise or the like can adversely affect an ascertainment result.

The fewer processing steps an ascertainment procedure has, the less complex it is and the faster it can be carried out. Advantageously, the plurality of different ascertainment methods therefore comprises at least two ascertainment methods with a different number of processing steps. A processing step comprises, for example, carrying out a specific mathematical operation with a respective sensor signal, such as forming a moving average to mask outliers in the sensor signal, or applying a noise filter, a Fourier transformation and the like. A processing step may also comprise multiple sensor signals, for example, if a correlation is ascertained and/or the sensor signals are checked for mutual plausibility.

Different positions and/or movement vectors can be ascertained for an object on the basis of the different ascertainment methods. Preferably, the most up to date position and movement vector are always used at any given point in time as the basis for determining a possible collision. If a position and a movement vector for an object have been ascertained by two different ascertainment methods, which are based on the same current sensor signals, then in particular the position and the movement vector, the respective accuracy and/or reliability of which is the higher, are used as the basis for ascertaining a possible collision. The accuracy and/or reliability can be determined, for example, in the form of an ascertainment error, which may be caused on the one hand by measurement errors and on the other hand by the ascertainment method itself.

Preferably, the position and movement vector for more than one of the detected objects of the number are ascertained, preferably for each detected object of the number.

In particular, the position and movement vector are constantly updated. For example, a new ascertainment is performed whenever a current sensor signal or a number of current sensor signals are received. In the following, therefore, the current position and the current movement vector can also be referred to.

On the basis of the drive state sensor signal received at a particular point in time and the position and the movement vector identified for the detected object, it is possible to determine whether a collision of the vehicle with the object moving according to its movement vector may occur in the future. In particular, the position of the vehicle and the object can be extrapolated based on the respective current drive state sensor signal, and the position of the object can be extrapolated based on the current position and the current movement vector of the object.

For example, if the extrapolated positions become too close at a given point in time, a collision is likely.

If a collision is likely, a warning signal is issued. The warning signal can be output directly to the user of the vehicle, for example as an acoustic, a haptic and/or a visual signal. The warning signal can also be output toward the outside of the vehicle, for example to the object, in particular as an acoustic warning signal. Further functions of the driver assistance system and/or other units of the vehicle may also be triggered when the warning signal is issued.

The warning signal is preferably output regardless of which ascertainment method was used to ascertain the position and movement vector of the object with which a possible collision was ascertained.

According to one embodiment of the method, the number of different ascertainment methods comprises at least one first ascertainment method in which for each detected object of the number, a Kalman filter is assigned and initialized, which is used to ascertain the position and the movement vector of the respective object.

This means that five assigned Kalman filters are initialized if five objects are detected. The Kalman filter (also known as the Kalman-Bucy filter, the Stratonovich-Kalman-Bucy filter or the Kalman-Bucy-Stratonovich filter) is a mathematical method for the iterative estimation of parameters, in the present case the position and movement vector of the object, on the basis of measurements containing errors, in the present case the received sensor signals. The Kalman filter is used to estimate non-directly measurable system variables while minimizing errors in the measurements. The Kalman filter describes an estimate by means of multidimensional normal distributions. These represent a probability distribution of possible errors around each estimate, and correlations between estimation errors of different variables. With this information, the previous estimates are optimally combined with the new measurements at each time step, so that remaining errors are minimized as quickly as possible. The Kalman filter has a current filter state at a current point in time, comprising the current estimates as well as error estimates and correlations. After each new measurement, the Kalman filter improves the previous estimates and updates the associated error estimates and correlations. In dynamic systems where, for example, a speed is also estimated, the Kalman filter also estimates correlations between the speed and, for example, the position, in particular on the basis of equations of motion, and takes these into account for the next time step.

The Kalman filter is preferably updated at least whenever a number of current sensor signals has been received.

According to one embodiment of the method, different sensor signals of the number are assigned different scanning regions in the environment, wherein each sensor signal from the number of sensor signals received at a given time, which is assigned to a specific scanning region in the environment, is supplied to the Kalman filter, the assigned object of which has a position that is located within the scanning region assigned to the sensor signal.

This ensures that for the next update the respective Kalman filter receives the particular sensor signal that also refers to the object assigned to the Kalman filter.

According to a further embodiment of the method, the output of the warning signal if a potential collision is ascertained on the basis of the position and the movement vector ascertained for the respective detected object using the first ascertainment method, takes place only if the ascertained movement vector of the object is non-zero.

In other words, no warning of a possible collision with an object is issued if the possible collision was ascertained on the basis of the position ascertained by the first ascertainment method and, for example, a movement of the vehicle, but the object itself is not moving but is static. It should be noted that this does not preclude issuing a warning of such a collision. For example, the potential collision can also be ascertained on the basis of the position of the object ascertained by another ascertainment method and a warning can then be issued accordingly.

According to a further embodiment of the method, it comprises:
    determining a driving tube for the vehicle on the basis of the received drive state sensor signal.

The term "driving tube" in this case describes in particular the surface that the vehicle would cover if it were moved forwards or backwards with the current wheel angle or steering angle. This means that a change in the steering angle or the wheel angle causes a change in the driving tube. For example, the driving tube may be represented by trajectories for each wheel of the vehicle. The driving tube can also be understood as a two-dimensional future trajectory of the vehicle.

According to a further embodiment of the method, a warning signal is output only if a distance from the respective object to the vehicle and/or to the ascertained driving tube is less than or equal to a lower threshold value.

The threshold value can be determined in a variable manner, in particular for different vehicles and/or situations. Furthermore, the threshold value can be determined based on the vehicle speed and/or the speed of the object. Furthermore, the threshold value can be determined based on a measurement accuracy, such as a standard deviation or a variance.

This embodiment has the advantage that a warning is only issued if the probability of a collision is relatively high. In particular, the threshold value takes into account the fact that it is unknown how the object will continue to move, i.e. whether it will change its speed and/or direction, for example. For example, the threshold value can assume a value from an interval of zero to two meters.

According to a further embodiment of the method, a warning signal is output only if the ascertained movement vector of the respective object points in the direction of the vehicle and/or the direction of the ascertained driving tube.

This has the advantage that no warning signal is issued, for example, for an object for which the current distance is below the lower threshold value, but which is moving away from the vehicle or the driving tube and with which a collision is therefore very unlikely.

According to a further embodiment of the method, step e) comprises:
    ascertaining a future trajectory of the detected object on the basis of the ascertained position and the movement vector, wherein a warning signal is output only if the ascertained future trajectory at at least one position falls below a predetermined minimum distance and/or has a point of intersection with the ascertained driving tube.

The future trajectory can be ascertained, for example, as an extrapolation of a previous trajectory of the object. In particular, a curved future trajectory may also be determined.

The predetermined minimum distance may be equal to the lower threshold value, but it may also be different from this. The predetermined minimum distance may be determined in a variable manner, in particular for different vehicles and/or situations. Furthermore, the predetermined minimum distance can be determined based on the vehicle speed and/or the speed of the object. Furthermore, the predetermined minimum distance can be determined based on a measurement accuracy, such as a standard deviation or a variance.

The feature that the predetermined minimum distance is determined on the basis of another variable, such as the vehicle speed, is understood to mean, for example, that the predetermined minimum distance is predetermined as a function of the other variable, so that a specific numerical value at a given time is determined depending on the current value of the other variable.

According to a further embodiment of the method, the received sensor signals comprise exclusively ultrasonic sensor signals.

This embodiment can be advantageously used for vehicles which exclusively have ultrasonic sensors. Compared to other sensors, such as radar, lidar and/or cameras, ultrasonic sensors are inexpensive to produce and their sensor signals do not require high computing power to evaluate.

This embodiment may also be advantageous for vehicles which have additional sensors, since the required computing power for the proposed method is lower than for alternative methods, which additionally carry out, for example, an image analysis of a camera image.

According to a further embodiment of the method, the number of different ascertainment methods comprises at least one second ascertainment method, in which a feature recognition is carried out on the basis of the number of sensor signals received at each point in time and a digital environment map is determined using recognized features.

The digital environment map can advantageously also be used to detect and warn about a collision with static objects. In comparison to the first ascertainment method, performing feature recognition (or feature extraction) is complex and requires more computing power. Therefore, the second ascertainment method may also take longer, in particular. Furthermore, moving objects sometimes might not be detected during feature extraction, for example if the sensor signal is changing rapidly and therefore looks like noise. This situation may arise in particular in the case of pedestrians and/or cyclists.

According to a further embodiment of the method, the method is carried out exclusively when the vehicle has a speed of less than or equal to 15 km/h, preferably less than or equal to 10 km/h, preferably less than or equal to 7 km/h, more preferably less than or equal to 5 km/h.

The vehicle speed can be ascertained in particular on the basis of the driving state sensor signal.

This is particularly advantageous when ultrasonic sensor signals are used, since ultrasonic sensors work relatively slowly due to the propagation speed of sound in air and are therefore less suitable for high speeds.

According to a second aspect, what is proposed is a computer program product that comprises commands that, when the program is executed by a computer, prompt said computer to perform the method according to the first aspect.

A computer program product, such as for example a computer program means, may for example be provided or supplied by a server in a network as a storage medium, such as for example a memory card, USB stick, CD-ROM, DVD, or else in the form of a downloadable file. This may take place for example in a wireless communication network by transmitting a corresponding file containing the computer program product or the computer program means.

According to a third aspect, a driver assistance system for a vehicle is proposed. The driver assistance system comprises a reception unit for receiving a drive state sensor signal, which indicates the drive state of the vehicle, at a number of different points in time, and for receiving a number of sensor signals, which indicate the environment of the vehicle, at a number of different points in time, a detection unit for detecting a number of objects in the environment of the vehicle on the basis of a first number of sensor signals, which have been received at a first point in time, an ascertainment unit for ascertaining a position and a movement vector for a detected object of the number on the basis of the first number of sensor signals and a second number of sensor signals, which have been received at a second point in time following the first point in time, using a plurality of different ascertainment methods, wherein different ascertainment methods of the plurality have a different degree of computing complexity, and an output unit for outputting a warning signal if a potential collision of the vehicle with the detected object is ascertained on the basis of the drive state sensor signal received at a specified point in time and the position and the movement vector ascertained for the detected object.

The embodiments and features described for the proposed method apply accordingly to the proposed driver assistance system. The advantages and/or definitions cited in relation to the method according to the first aspect also apply to the proposed driver assistance system. The driver assistance system is operated in particular using the method according to the first aspect or one of the embodiments of the method.

Each of the units of the driver assistance system may be implemented in hardware and/or software. In the case of an implementation in hardware, the respective unit may be in the form of a computer or a microprocessor, for example. In the case of an implementation in software, the respective unit may be in the form of a computer program product, a function, a routine, an algorithm, part of a program code, or an executable object. Furthermore, each of the units mentioned here may also be in the form of part of a superordinate control system of the vehicle, such as a central control system and/or an ECU (Engine Control Unit).

The driver assistance system can be configured in particular for semi-autonomous or fully autonomous driving of the vehicle. Semi-autonomous driving is understood to mean, for example, that the driver assistance system controls a steering apparatus and/or an automatic gear selection system. Fully autonomous driving is understood to mean, for example, that the driver assistance system additionally also controls a drive device and a braking device.

According to a fourth aspect, what is proposed is a vehicle having a number of environmental sensor units for detecting the environment of the vehicle and for outputting a respective sensor signal, and having a driver assistance system according to the third aspect.

The vehicle is, for example, an automobile or even a truck. Preferably, the vehicle comprises a number of sensor units which are configured to capture the drive state of the vehicle and to capture the environment of the vehicle. Examples of such sensor units of the vehicle are image capture devices, such as a camera, a radar (radio detection and ranging) or a lidar (light detection and ranging), ultrasonic sensors, location sensors, wheel angle sensors and/or wheel speed sensors. The sensor units are each configured to output a sensor signal, for example to the driver assistance system which carries out the semi-autonomous or fully autonomous driving on the basis of the detected sensor signals.

According to one embodiment of the vehicle, the environmental sensor units comprise exclusively ultrasonic sensors.

This allows for a less complex vehicle that is inexpensive to manufacture.

According to another embodiment of the vehicle, the vehicle has a mass of more than 2.5 tons and/or a length of more than 5 meters.

For example, the input module is designed as a delivery van. Delivery vans, for example, have poor visibility and may have one or more "blind spots" that a driver of the transporter can hardly see or not see at all. Such a blind spot may be located, for example, on the passenger side behind the A-pillar or on the driver and/or passenger side near the vehicle.

In particular in large vehicles and/or those with poor visibility, the method has the advantage that a warning can be issued in the event of an imminent collision with an object that is located in an area in the vicinity of the vehicle that is difficult or impossible for the driver to see.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred embodiments with reference to the accompanying figures.

Identical or functionally identical elements have been provided with the same reference signs in the figures, unless stated otherwise.

Figure 1:
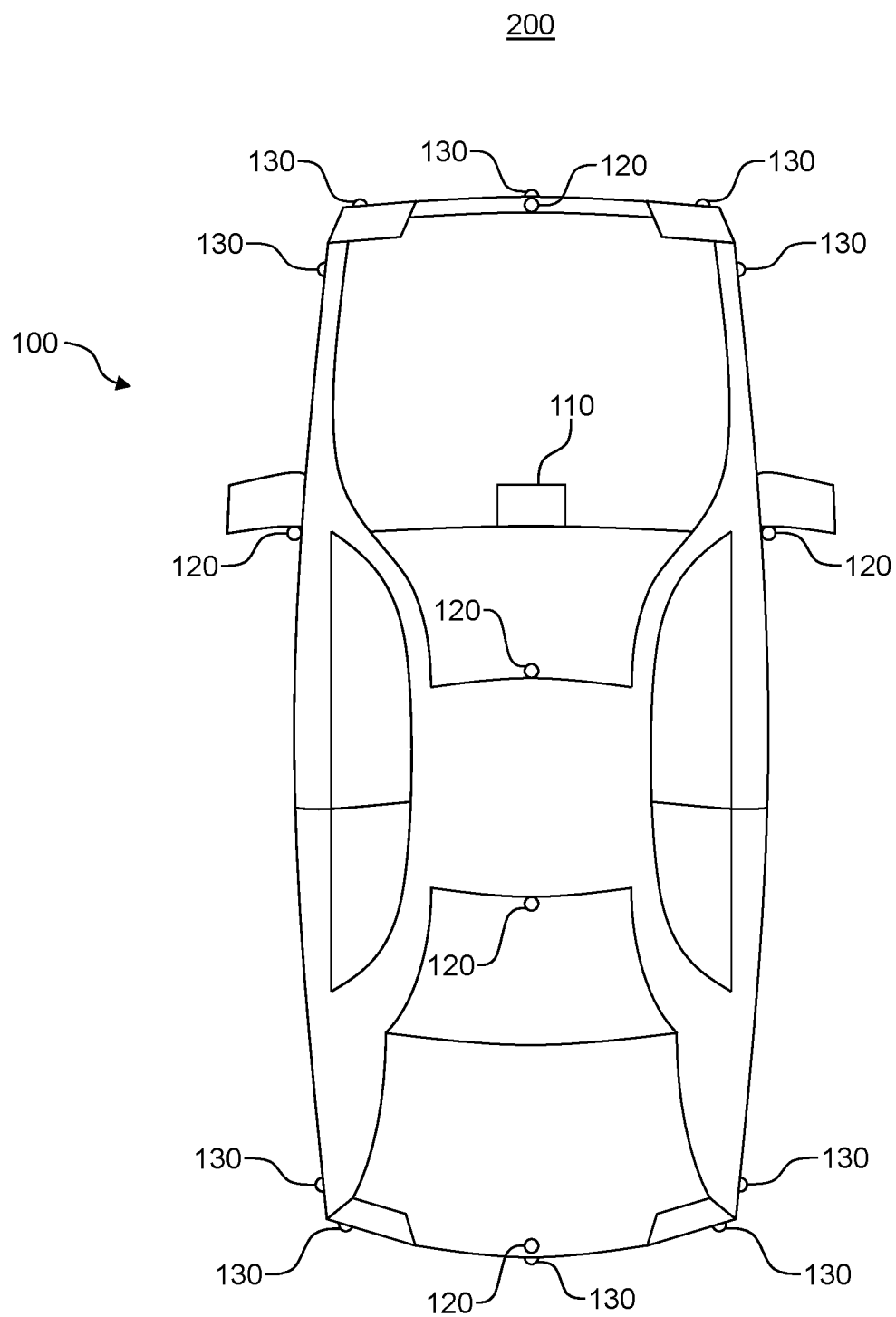
FIG. 1 shows a schematic view of an exemplary embodiment of a vehicle.

FIG. 1 shows a schematic view of a vehicle 100 from a bird's eye perspective. The vehicle 100 is, for example, an automobile that is arranged in an environment 200. The automobile 100 has a driver assistance system 110 that is in the form of a control unit, for example. In addition, a plurality of environment sensor devices 120, 130 are arranged on the automobile 100, which can be, for example, optical sensors 120 and ultrasonic sensors 130. The optical sensors 120 comprise for example visual cameras, a radar and/or a lidar. The optical sensors 120 may each capture an image of a respective region from the environment 200 of the automobile 100 and output it as an optical sensor signal. The ultrasonic sensors 130 are configured in particular for scanning a respective region 131-136 (see FIG. 2) of the environment 200. For example, objects 210, 211 (see FIGS. 2-5) can be detected on the basis of the sensor signal emitted by the ultrasonic sensors 130 and a distance to the objects 210, 211 can be ascertained. For example, a movement vector VEC (see FIGS. 3-5) of an object 210, 211 can be ascertained from consecutive sensor signals. Using the sensor signals captured by the sensors 120, 130, the driver assistance system 110 may be able to drive the automobile 100 partially autonomously or even fully autonomously. In addition to the optical sensors 120 and ultrasonic sensors 130 illustrated in FIG. 1, provision may be made for the vehicle 100 to have various other sensor devices 120, 130. Examples of these are a microphone, an acceleration sensor, a wheel speed sensor, a wheel angle sensor, a steering angle sensor, an antenna having a coupled receiver for receiving electromagnetically transmissible data signals, and the like.

Figure 5:
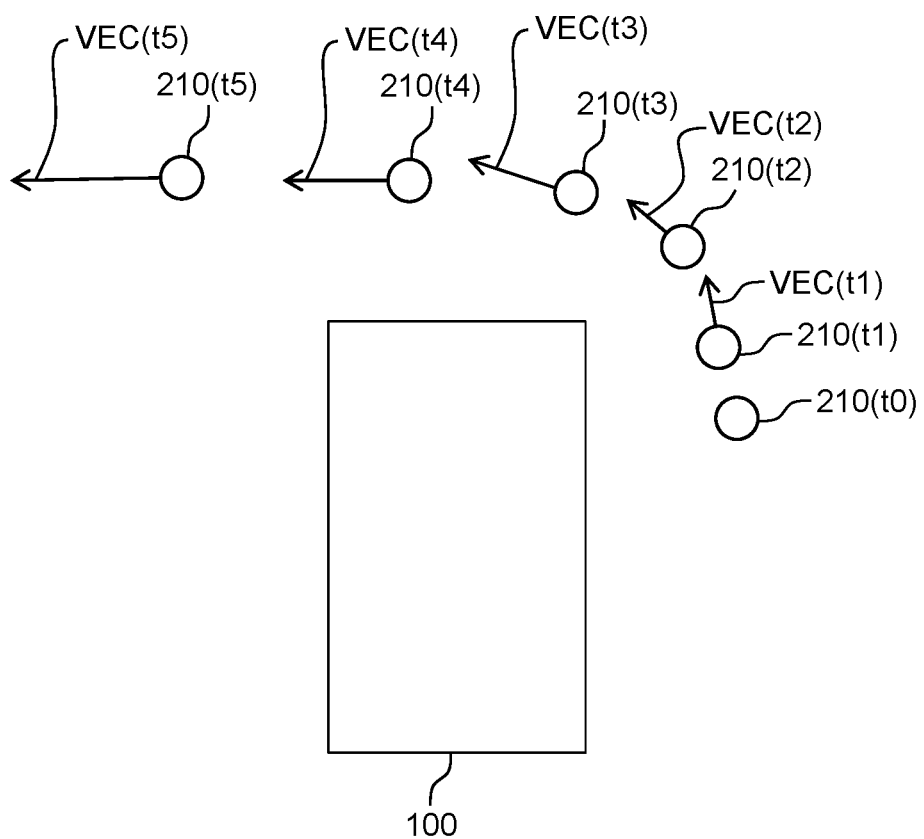
FIG. 5 shows a schematic view of a third traffic situation at different points in time.
Figure 6:
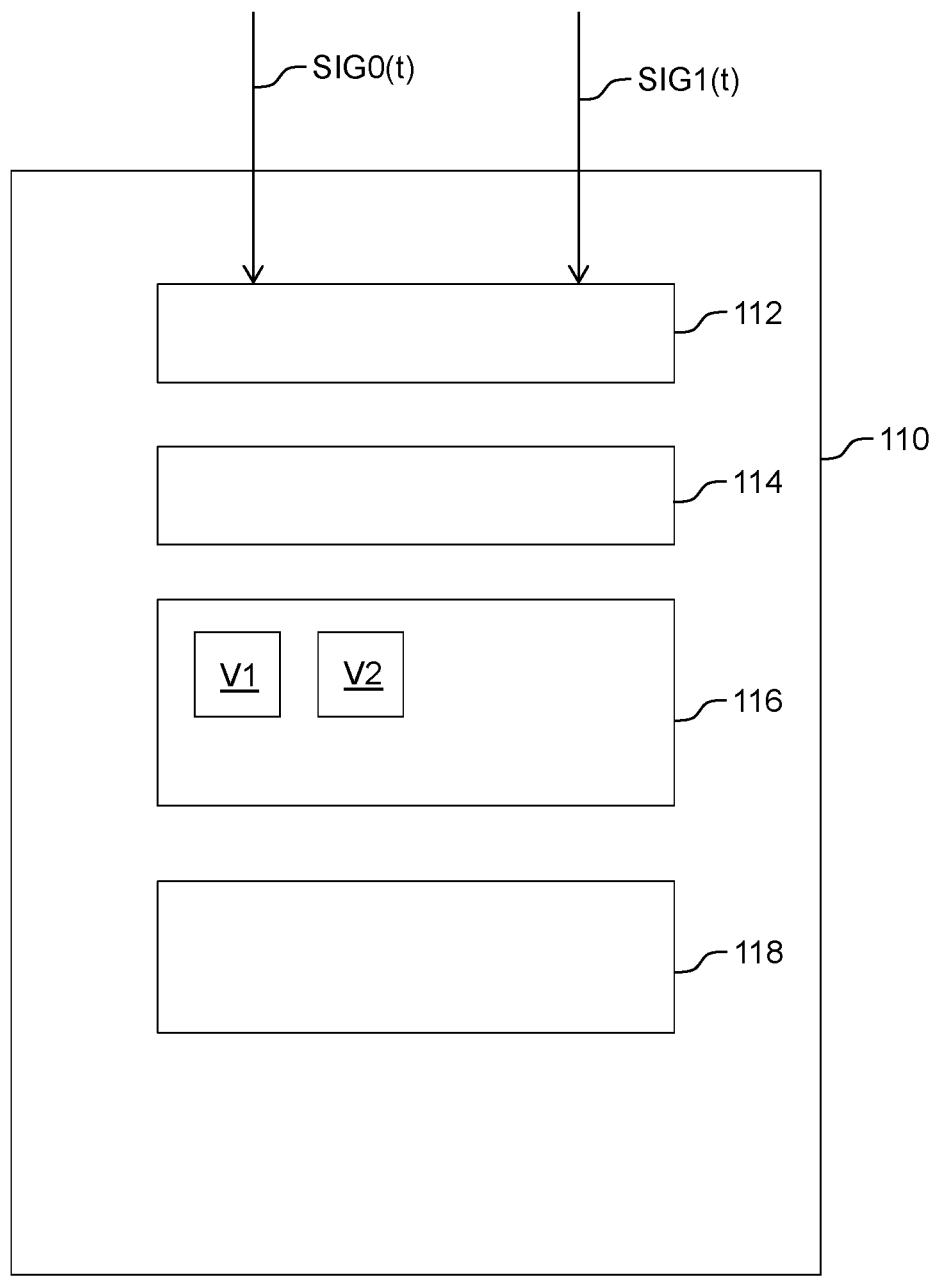
FIG. 6 shows a schematic block diagram of an exemplary embodiment of a driver assistance system.
Figure 7:
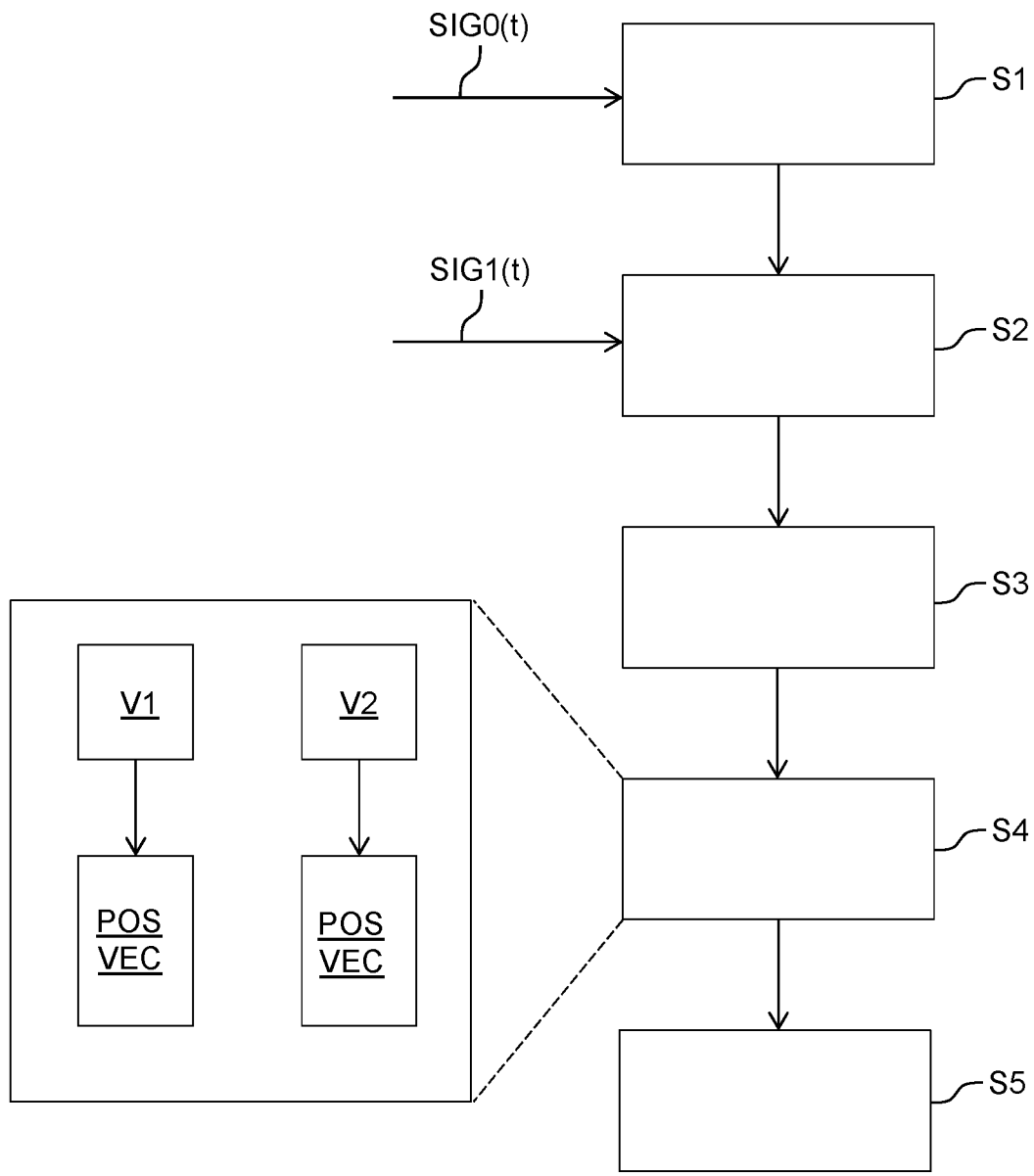
FIG. 7 shows a schematic block diagram of an exemplary embodiment of a method for operating a driver assistance system.

The driver assistance system 110 is designed, for example, as explained in more detail on the basis of FIG. 6 and is configured to carry out the method explained on the basis of FIG. 7. Preferably, the driver assistance system 110 is further configured to carry out processing processes as described below with reference to FIGS. 2-5.

Figure 2:
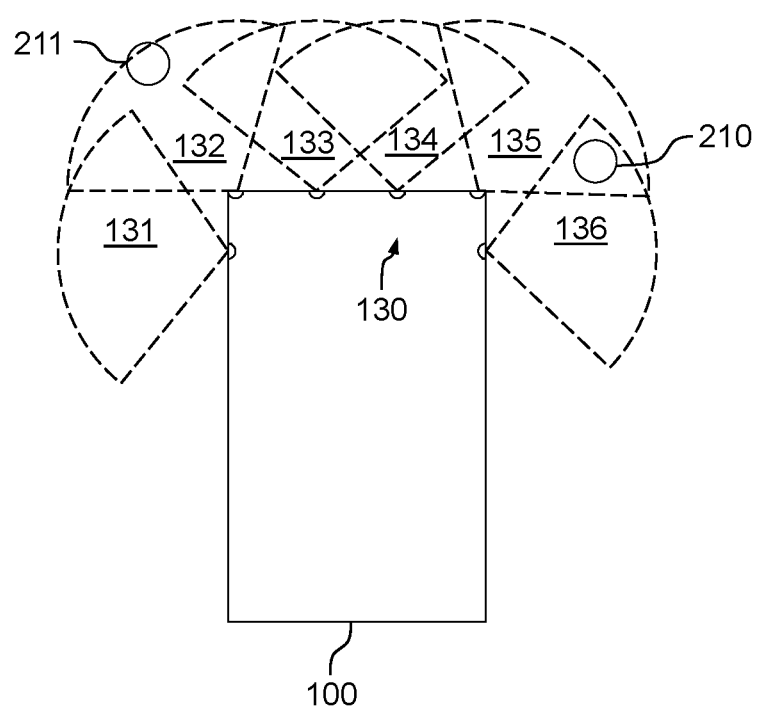
FIG. 2 shows a schematic view of different scanning regions.

FIG. 2 shows a schematic view of different scanning regions 131-136 of different ultrasonic sensors 130. In this example, six ultrasonic sensors 130 are arranged on a front sill of a vehicle 100. The vehicle 100 is designed, for example, as described on the basis of FIG. 1. Each sensor 130 has a specific scanning region 131-136. The shape of a respective scanning region 131-136 depends on the arrangement and orientation of the ultrasonic sensor 130 on the vehicle 100, but also on the design of the ultrasonic sensor 130. The scanning regions 131-136 can at least partially overlap, so that the direct environment 200 in front of the sill of the vehicle 100 can preferably be captured without gaps. The range of a respective ultrasonic sensor 130 depends on its design, and is, for example, in a range between five meters to ten meters.

In addition to the six ultrasonic sensors 130 shown here, which are physically present, additional virtual ultrasonic sensors (not shown) may be present. For example, a virtual ultrasonic sensor is based on the principle that a first ultrasonic sensor 130 emits an ultrasonic signal and a second ultrasonic sensor 130 receives a reflection of the ultrasonic signal emitted by the first ultrasonic sensor. For example, a virtual ultrasonic sensor has a virtual position between two physically present ultrasonic sensors 130.

Two objects 210, 211 are located in the environment 200 of the vehicle 100. A first object 210, for example a cyclist, is located in the scanning regions 135, 136 of two ultrasonic sensors 130. The cyclist 210 is therefore detected in particular by two ultrasonic sensors. In addition, the cyclist can be detected by a virtual ultrasonic sensor as described above. A second object 211, for example a pedestrian, is located in the scanning region 132 of a single ultrasonic sensor 130. However, the pedestrian 211 can also be detected by a virtual ultrasonic sensor as described above.

To ascertain the position POS (see FIG. 7) and the movement vector VEC (see FIGS. 3-5) of a given object 210, 211 by means of a first ascertainment method V1 (see FIG. 6 or 7), a Kalman filter is assigned to each detected object 210, 211 and initialized. Therefore, in this example, two Kalman filters are initialized. Each Kalman filter is configured to estimate the position of the respective object 210, 211 on the basis of the consecutively received ultrasonic sensor signals $SIG1(t)$. The position in particular comprises the position POS and the movement vector VEC of the respective object 210, 211. In particular, each Kalman filter is supplied with the received ultrasonic sensor signals $SIG1(t)$ of those ultrasonic sensors 130 in the scanning regions 131-136 of which the respective object 210, 211 is currently located. This enables an accurate and consistent result and a precise tracking of the objects 210, 211. A second ascertainment method V2 (see FIG. 6 or 7) may provide that a feature extraction is carried out on the basis of the number of sensor signals $SIG1(t)$ received at a particular time t0-t5 (see FIG. 5) and a digital environment map is ascertained using extracted features.

Figure 3:
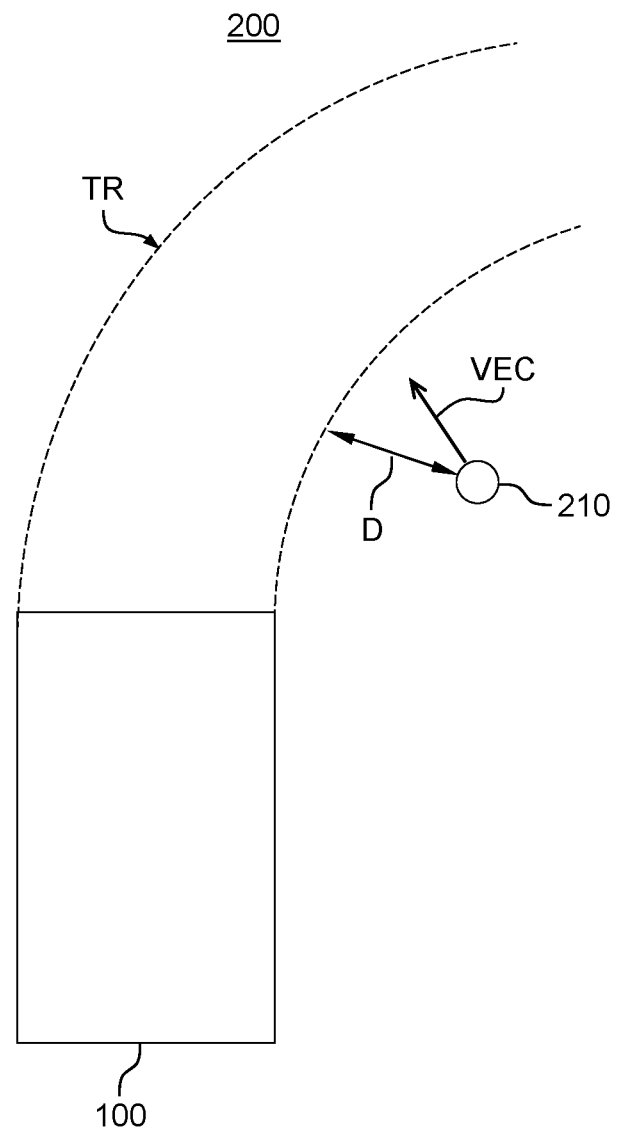
FIG. 3 shows a schematic view of a first traffic situation.

FIG. 3 shows a schematic view of a first traffic situation in which, for example, the vehicle 100 of FIG. 1 or FIG. 2 is shown on a road. To the right in front of the vehicle 100, an object 210 is shown, for example a pedestrian. The driving tube TR for the vehicle 100 is also shown. The driving tube TR is ascertained, for example, by the driver assistance system 110 (see FIG. 1 or 6) on the basis of a drive state sensor signal $SIG0(t)$ (see FIG. 6 or 7), which comprises a current steering angle or a current wheel angle.

The ultrasonic sensors 130 (see FIG. 1 or 2) transmit ultrasonic signals preferably constantly and detect the reflected signals, which is to say, they constantly scan their respective scanning region 131-136 (see FIG. 2) with ultrasonic signals. For example, the scanning takes place 10 times per second, preferably at least 50 times per second, preferably at least 100 times per second. The ultrasonic sensors 130 emit ultrasonic sensor signals $SIG1(t)$ (see FIG. 6 or 7) at a corresponding frequency, for example to the driver assistance system 110. On the basis of the ultrasonic sensor signals, a position POS (see FIG. 7) of the pedestrian 210 can be inferred. On the basis of at least two consecutively detected ultrasonic sensor signals SIG(t), a movement vector VEC for the pedestrian 210 can also be ascertained. This is carried out, for example, as described by reference to FIG. 2, by using a first ascertainment method V1

In the situation shown, the pedestrian 210 is moving toward the driving tube TR of the vehicle 100. The current distance D of the pedestrian 210 from the driving tube TR is also shown. The driving assistance system 110 is configured to output a warning signal depending on predetermined criteria. For example, it is checked whether the distance D of the pedestrian 210 from the current driving tube TR (alternatively from the vehicle 100) is less than or equal to a predetermined threshold value, or whether the ascertained movement vector VEC points in the direction of the driving tube TR or toward the vehicle 100. If one or more of these criteria are met, the warning signal is output, since a collision with the pedestrian 210 is then likely unless the vehicle 100 is stopped or changes direction.

In other words, the warning signal is output if a potential collision of the vehicle 100 with the detected object 210, 211 is ascertained on the basis of the drive state sensor signal SIG0(t) received at a specified point in time t0-t5 (see FIG. 5) and the position POS and the motion vector VEC ascertained for the detected object 210, 211.

Figure 4:
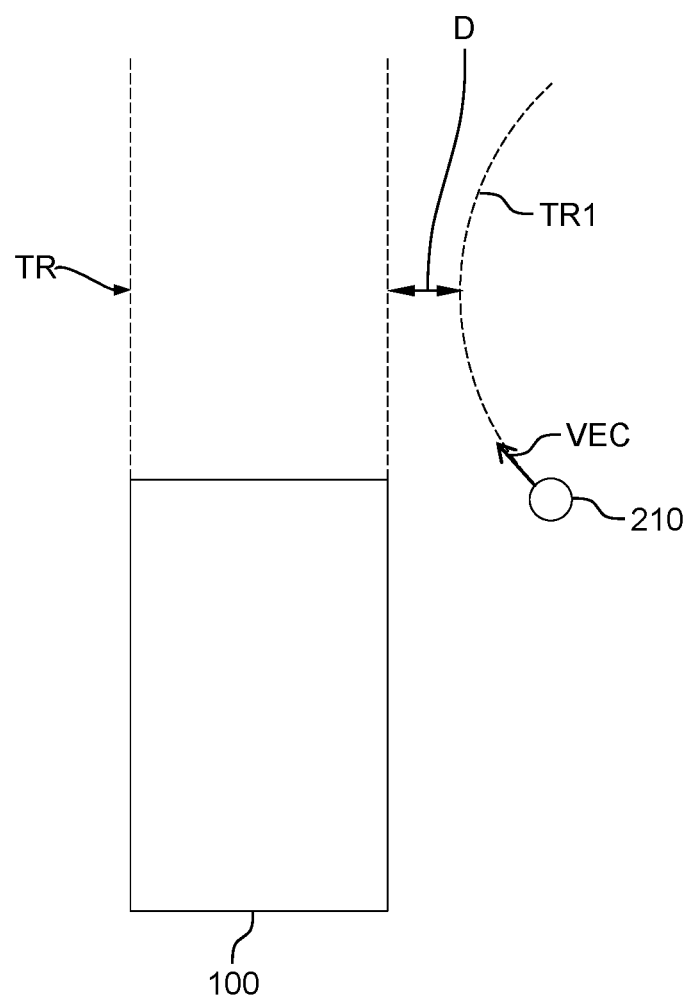
FIG. 4 shows a schematic view of a second traffic situation.

FIG. 4 shows a schematic view of a second traffic situation, in which, for example, the vehicle 100 of FIG. 1 or FIG. 2 is shown on a road. To the right in front of the vehicle 100, an object 210 is shown, for example a pedestrian. The driving tube TR for the vehicle 100 is also shown. The driving tube TR is ascertained, for example, by the driver assistance system 110 (see FIG. 1 or 6) on the basis of a drive state sensor signal SIG0(t) (see FIG. 6 or 7), which comprises a current steering angle or a current wheel angle.

On the basis of ultrasonic sensor signals SIG1(t) (see FIG. 6 or 7), a position POS (see FIG. 7) and a movement vector VEC of the pedestrian 210 are ascertained. In addition, a future trajectory TR1 of the pedestrian 210 is ascertained in this example. For this purpose, for example, the previous trajectory of the pedestrian 210 is extrapolated. For example, the future trajectory TR1 can be ascertained on the basis of a specific embodiment of the first ascertainment method V1, which is to say, using Kalman filters. In addition and/or alternatively, the future trajectory TR1 can be ascertained on the basis of a third ascertainment method.

A smallest distance between the driving tube TR and the future trajectory TR1 can be ascertained. If this distance D is less than a predetermined minimum distance, a warning signal is issued, for example.

FIG. 5 shows a schematic view of a third traffic situation at different points in time t0-t5, in which, for example, the vehicle 100 of FIG. 1 or FIG. 2 is shown on a road. At a start time to, an object 210 is ascertained to the right of the vehicle 100. This is carried out in particular on the basis of a number of sensor signals SIG1(t) received at the start time to (see FIG. 6 or 7). At a subsequent first point in time t1, a second number of sensor signals SIG1(t) is received. On the basis of the second number of sensor signals, a current position POS (see FIG. 7) of the object 210(t1) is ascertained. Furthermore, a current movement vector VEC(t1) at the time t1 can be ascertained on the basis of the first number and the second number of sensor signals SIG1(t). At a subsequent second time t2, a third number of sensor signals SIG1(t) is received and a current position POS of the object 210(t2) at time t2 and a current movement vector VEC(t2) at time t2 are ascertained. At a subsequent third time t3, a fourth number of sensor signals SIG1(t) is received and a current position POS of the object 210(t3) at time t3 and a current movement vector VEC(t3) at time t3 are ascertained. At a subsequent fourth time t4, a fifth number of sensor signals SIG1(t) is received and a current position POS of the object 210(t4) at time t4 and a current movement vector VEC(t4) at time t4 are ascertained. At a subsequent fifth time t5, a sixth number of sensor signals SIG1(t) is received and a current position POS of the object 210(t5) at time t5 and a current movement vector VEC(15) at time t5 are ascertained. Thus, the movement of the object 210 can be tracked at each point in time t0-t5. In embodiments, a prediction of the movement of the object 210 can also be carried out, for example, using corresponding equations of motion.

The ascertainment of the position POS and the movement vector VEC at a particular time t0-t5 is preferably carried out on the basis of the first ascertainment method V1 using a Kalman filter and on the basis of a further ascertainment method V2 (see FIG. 6 or 7)

FIG. 6 shows a schematic block diagram of an exemplary embodiment of a driver assistance system 110, for example the driver assistance system 110 of the vehicle 100 of FIG. 1. The driver assistance system 110 comprises a reception unit 112 for receiving a drive state sensor signal SIG0(t), which indicates a drive state of the vehicle 100, at a number of different points in time t0-t5 (see FIG. 5), and for receiving a number of sensor signals SIG1(t), which indicate the environment 200 (see FIG. 1 or 2) of the vehicle 100, at a number of different points in time t0-t5. The driver assistance system 110 further comprises a detection unit 114 for detecting a number of objects 210, 211 (see FIG. 2) in the environment 200 of the vehicle 100 on the basis of a first number of sensor signals SIG1(t), which have been received at a first point in time, an ascertainment unit 116 for determining a position POS (see FIG. 7) and a movement vector VEC (see FIGS. 3-5) for a detected object 210, 211 on the basis of the first number of sensor signals SIG(t) and a second number of sensor signals SIG(t), received at a second time following the first time, using a plurality of different ascertainment methods V1, V2, wherein different ascertainment methods of the plurality have a different computing complexity, and an output unit 118 for outputting a warning signal if a potential collision of the vehicle 100 with the detected object 210, 211 is ascertained on the basis of the drive state sensor signal SIG0(t) received at a specified time t0-t5 and the position POS and the movement vector VEC ascertained for the detected object 210, 211.

FIG. 7 shows a schematic block diagram of an exemplary embodiment of a method for operating a driver assistance system 110, for example the driver assistance system 110 of FIG. 6 or the driver assistance system 110 of the vehicle 100 of FIG. 1. In a first step S1, a drive state sensor signal SIG0(t), which indicates a drive state of the vehicle 100, is received at a number of different points in time t0-t5 (see FIG. 5). In a second step S2, a number of sensor signals SIG1(t), which indicate the environment 200 (see FIG. 1 or 2) of the vehicle 100, is received at a number of different points in time t0-t5. In a third step S3, a number of objects 210, 211 (see FIG. 2) in the environment 200 of the vehicle 100 is detected on the basis of a first number of sensor signals SIG1(t), which have been received at a first point in time. In a fourth step S4, a position POS and a movement vector VEC (see FIGS. 3-5) for a detected object 210, 211 is ascertained on the basis of the first number of sensor signals SIG1(t) and a second number of sensor signals SIG1(t), received at a second point in time following the first point in time, using a plurality of different ascertainment methods V1, V2, wherein different ascertainment methods V1, V2 of the plurality have a different computing complexity. In a fifth step S5, a warning signal is output if a potential collision of the vehicle 100 with the detected object 110 is ascertained on the basis of the drive state sensor signal SIG0(t) received at a specified point in time t0-t5 and the position POS and the movement vector VEC ascertained for the detected object 210.

Although the present invention has been described on the basis of exemplary embodiments, it may be modified in many ways.

LIST OF REFERENCE SIGNS 100 vehicle
110 driver assistance system
112 reception unit
114 capture unit
116 ascertainment unit 118 output unit
120 sensor
130 sensor
131 scanning region
132 scanning region
133 scanning region
134 scanning region
135 scanning region
136 scanning region
200 environment
210 object
210(t0) object
210(t1) object
210(t2) object
210(t3) object
210(t4) object
210(t5) object
211 object
D distance
POS position
S1 method step
S2 method step
S3 method step
S4 method step
S5 method step
SIG0(t) drive state sensor signal
SIG1(t) sensor signal
t time
t0 point in time
t1 point in time
t2 point in time
t3 point in time
t4 point in time
t5 point in time
TR driving tube
TR1 trajectory
V1 ascertainment method
V2 ascertainment method
VEC movement vector
VEC(t1) movement vector
VEC(t2) movement vector
VEC(t3) movement vector
VEC(t4) movement vector
VEC(t5) movement vector

The invention claimed is:

1. A method for operating a driver assistance system for a vehicle, the method comprising:
   a) receiving a drive state sensor signal, which indicates the drive state of the vehicle, at a number of different points in time,
   b) receiving a number of sensor signals, which indicate the environment of the vehicle, at a number of different points in time;
   c) detecting a number of objects in the environment of the vehicle on the basis of a first number of sensor signals, which have been received at a first point in time;
   d) ascertaining a position and a movement vector for a detected object on the basis of the first number of sensor signals and a second number of sensor signals, which have been received at a second point in time following the first point in time, using a plurality of different ascertainment methods, wherein different ascertainment methods of the plurality have a different degree of computing complexity; and
   e) outputting a warning signal if a potential collision of the vehicle with the detected object is ascertained on the basis of the drive state sensor signal received at a specified point in time and the position and the movement vector ascertained for the detected object,
   wherein the number of different ascertainment methods comprise at least one first ascertainment method, in which for each detected object of the number a Kalman filter is assigned and initialized, which is used to ascertain the position and the movement vector of the respective object, and at least one second ascertainment method, in which a feature recognition is carried out on the basis of the number of sensor signals received at each point in time and a digital environment map is determined using recognized features, and
   wherein the output of the warning signal, if a potential collision is ascertained on the basis of the position and the movement vector ascertained for the respective detected object using the first ascertainment method, takes place only when the ascertained movement vector of the object is non-zero.

2. The method as claimed in claim 1,
   wherein different sensor signals of the number are assigned different scanning regions in the environment,
   wherein each sensor signal from the number of sensor signals received at a given time, which is assigned to a specific scanning region in the environment, is supplied to the Kalman filter, the assigned object of which has a position that is located within the scanning region assigned to the sensor signal.

3. The method as claimed in claim 1,
   characterized by determining a driving tube for the vehicle on the basis of the received drive status sensor signal.

4. The method as claimed in claim 3,
   wherein a warning signal is output only if a distance from the respective object to the vehicle and/or to the ascertained driving tube is less than or equal to a lower threshold value.

5. The method as claimed in claim 3,
   wherein a warning signal is output only if the ascertained movement vector of the respective object points in the direction of the vehicle and/or the direction of the ascertained driving tube.

6. The method as claimed in claim 3,
   wherein step e) comprises:
   ascertaining a future trajectory of the detected object on the basis of the ascertained position and the movement vector, wherein a warning signal is only output if the ascertained future trajectory at at least one position falls below a predetermined minimum distance and/or has a point of intersection with the ascertained driving tube.

7. The method as claimed in claim 1,
   wherein the received sensor signals exclusively comprise ultrasonic sensor signals.

8. The method as claimed in claim 1,
   wherein the method is carried out exclusively if the vehicle has a speed of less than or equal to 15 km/h.

9. A computer program product comprising instructions that, when the program is executed by a computer, cause said computer to perform the method as claimed in claim 1.

10. A driver assistance system for a vehicle comprising:
    a reception unit for receiving a drive state sensor signal, which indicates a drive state of the vehicle, at a number of different points in time, and for receiving a number of sensor signals, which indicate the environment of the vehicle, at a number of different points in time;

a detection unit for detecting a number of objects in the environment of the vehicle on the basis of a first number of sensor signals, which have been received at a first point in time;

an ascertainment unit for ascertaining a position and a movement vector for a detected object on the basis of the first number of sensor signals and a second number of sensor signals, which have been received at a second point in time following the first point in time, using a plurality of different ascertainment methods, wherein different ascertainment methods of the plurality have a different degree of computing complexity, and comprise at least one first ascertainment method, in which for each detected object of the number a Kalman filter is assigned and initialized, which is used to ascertain the position and the movement vector of the respective object, and at least one second ascertainment method, in which a feature recognition is carried out on the basis of the number of sensor signals received at each point in time and a digital environment map is determined using recognized features; and an output unit for outputting a warning signal if a potential collision of the vehicle with the detected object is ascertained on the basis of the drive state sensor signal received at a specified point in time and the position and the motion vector ascertained for the detected object, wherein the output of the warning signal, if a potential collision is ascertained on the basis of the position and the movement vector ascertained for the respective detected object using the first ascertainment method, takes place only when the ascertained movement vector of the object is non-zero.

11. A vehicle comprising a number of environmental sensor units for capturing an environment of the vehicle and for outputting a respective sensor signal, and having a driver assistance system as claimed in claim 10.

12. The vehicle as claimed in claim 11,
wherein the environmental sensor units exclusively comprise ultrasonic sensors.

13. The vehicle as claimed in claim 11,
wherein the vehicle has a mass of more than 2.5 tons and/or a length of more than 5 meters.

* * * * *